(12) United States Patent
Foss et al.

(10) Patent No.: US 6,378,249 B1
(45) Date of Patent: Apr. 30, 2002

(54) LID LIFTING MECHANISM

(75) Inventors: George T. Foss; Frank E. Heywood; William M. Maser, all of Cambridge (CA)

(73) Assignee: 3L Filters Ltd., North Cambridge (CA)

( * ) Notice: Subject to any disclaimer, the term of this patent is extended or adjusted under 35 U.S.C. 154(b) by 0 days.

(21) Appl. No.: 09/592,158

(22) Filed: Jun. 12, 2000

Related U.S. Application Data (60) Provisional application No. 60/169,925, filed on Dec. 10, 1999.

(51) Int. Cl.⁷ .................................................. E05F 1/10
(52) U.S. Cl. ........................................................ 49/386
(58) Field of Search ................................ 49/386; 16/65, 16/80, 72, 81, 85, DIG. 10, DIG. 39

(56) References Cited

U.S. PATENT DOCUMENTS

| | | | |
|---|---|---|---|
| 1,731,561 A | * | 10/1929 | Campbell et al. |
| 2,641,019 A | * | 6/1953 | Burke |
| 3,144,165 A | | 8/1964 | Pegon et al. |
| 3,310,329 A | | 3/1967 | Luker |
| 3,555,732 A | | 1/1971 | Ballard |
| 3,561,162 A | | 2/1971 | Goldman |
| 4,137,669 A | * | 2/1979 | Nunlist .......................... 49/386 |
| 4,145,843 A | | 3/1979 | Lyons |
| 4,520,977 A | * | 6/1985 | Holzhauser et al. ......... 248/201 |
| 5,038,520 A | | 8/1991 | Amorese et al. |

FOREIGN PATENT DOCUMENTS

| | | | | |
|---|---|---|---|---|
| FR | 378919 | * | 10/1907 | .................. 49/386 |
| GB | 2226361 | * | 6/1990 | .................. 49/386 |

* cited by examiner

*Primary Examiner*—Jerry Redman
(74) *Attorney, Agent, or Firm*—Alston & Bird LLP (57) ABSTRACT

A lid lifting mechanism for heavy vessel lids provides for optimum mechanical advantage in counterbalancing the weight of the lid when pivoting the lid to an open position. The mechanism has a pivot arm secured to the lid and a pivot mount intermediate the length of the pivot arm where the pivot mount is secured to the vessel container. The pivot arm extends beyond the pivot mount to provide a distal end. A pretensioned retracting device is connected to the distal end by a connector which can be selectively moved along the arm to increase or decrease the moment arm length. Such movement of the connector or the pretensioned device adjusts the extent of retracting device assist in pivoting the lid to a lid open position. This system provides for maximum mechanical advantage while adjusting for build up of material on the inside of the lid.

7 Claims, 6 Drawing Sheets

LID LIFTING MECHANISM

This application claims benefit of provisional application No. 60/169,925, filed on Dec. 10, 1999.

FIELD OF THE INVENTION

This invention relates to a lid lifting mechanism and more particularly for assisting in lifting heavy lids of various types of vessels such as pressure vessels.

BACKGROUND OF THE INVENTION

Counter balancing systems for lid lifting mechanisms are well known. Examples of such systems are described in U.S. Pat. Nos. 3,555,732, 3,561,162 and 4,145,843. These various types of lid lifting mechanisms involved counter balancing springs which are interposed between the container and the lid by a mechanical linkage such that when an attempt is made to open the lid, the energy stored in the lid lifting mechanism is released to assist in raising the lid.

A device for assisting in lifting heavier lids such as manhole covers is described in U.S. Pat. No. 5,038,520. A pretensioned spring is connected to a lever arm which is in turn connected to the lid. Upon raising the manhole cover the pretensioned spring inserts pressure on the lever arm to rotate the lid about its pivot point and assist in raising the lid. The pretensioned spring can be set to provide the correct amount of compressive energy to exert the proper amount of force in assisting in opening the lid.

U.S. Pat. Nos. 3,144,165 and 3,310,329 describe lid opening systems for pressure vessels. Both systems rely on motive power from a pressure cylinder or electric motor so that there is more than enough power to raise the lid. In U.S. Pat. No. 3,144,165, an electric motor rotates a screw which is connected to a threaded device at the end of a lever arm attached to the lid by actuating the motor the screw retracts the threaded device along its length thereby raising the lid to the open position. Sufficient power may be designed into the motor to open the lid as the lever arm pivots about its pivot point. Similarly in U.S. Pat. No. 3,310,329, a fluid driven piston is provided which when retracted moves the lid to the open position by pulling down on an arm member attached to the lid. These systems are quite substantial in structure and require periodic maintenance due to the nature of the power drives.

It is an object of an aspect of this invention to provide a lid lifting mechanism which is mechanically actuated so that it is inexpensive to build and easy to maintain.

SUMMARY OF THE INVENTION

It is an object of an aspect of this invention to provide a lid lifting mechanism for assisting in pivoting to an open position, a lid for a vessel, the mechanism comprises:
  i) a pivot arm adapted to be secured to a vessel lid, the pivot arm having a pivot mount intermediate its length, the pivot arm extending beyond the pivot mount to provide a distal end;
  ii) a pretensioned retracting device for assisting in pivoting the arm from a lid closed to a lid open position, and means for adjusting retracting device tension;
  iii) a connector for connecting the retracting device to the distal end, means for mounting the connector on the arm distal end for movement along the arm to increase or decrease moment arm length of the retracting device relative to the pivot mount and thereby adjust extent of retracting device assist in pivoting the lid to a lid open position.

BRIEF DESCRIPTION OF THE DRAWINGS

The preferred embodiments of the invention are shown in the drawings wherein.

DETAILED DESCRIPTION OF THE PREFERRED EMBODIMENTS

Figure 1:
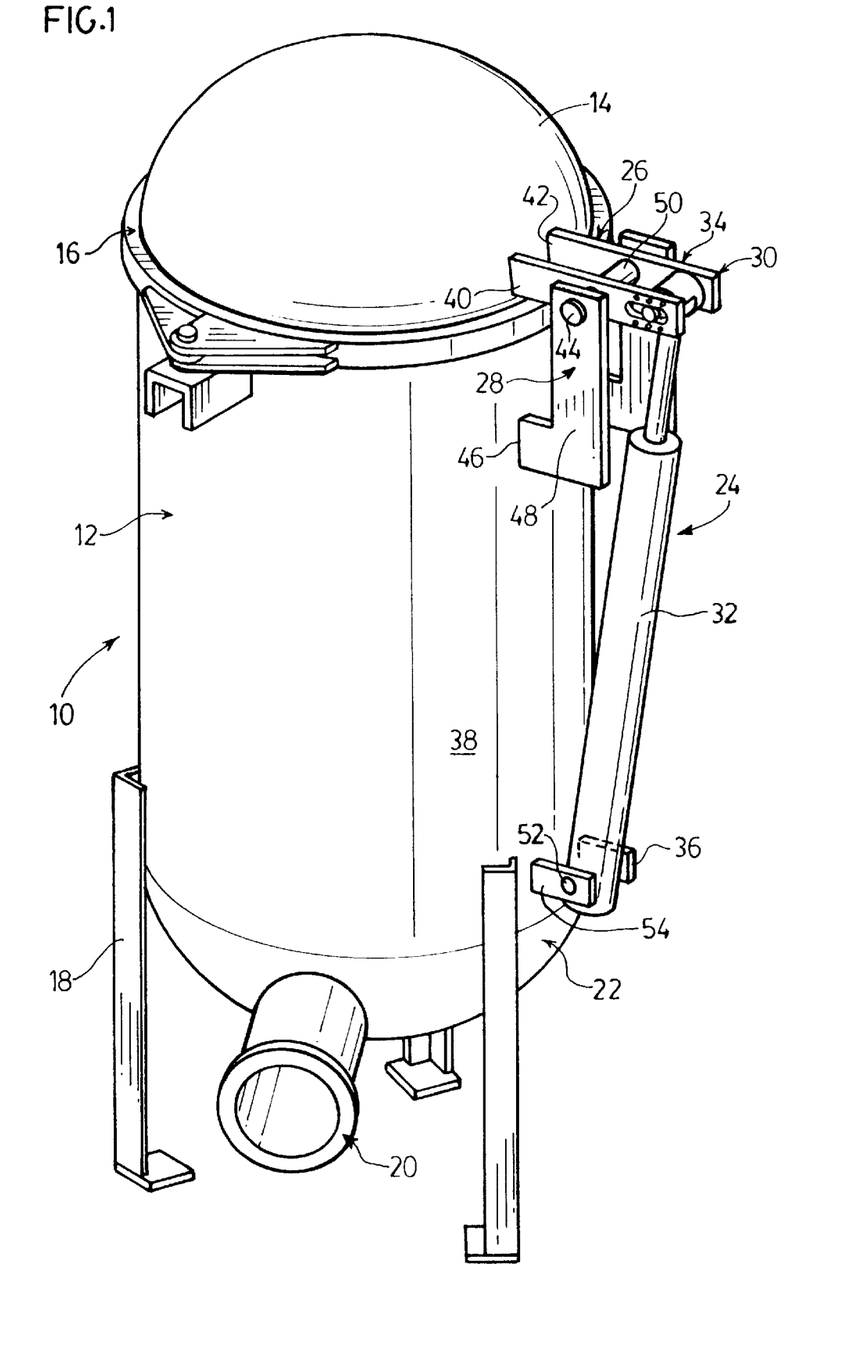
FIG. 1 is a perspective view if a vessel with a preferred embodiment of the lid lifting mechanism of this invention.

With reference to FIG. 1, a conventional style pressure vessel 10 has a container 12 and a lid 14. The lid 14 is secured to the container 12 by a clamping mechanism 16. The container 12 is supported on a floor or a suitable foundation by standards 18. The usual outlet 20 is provided at the base 22 of the container. Due to the substantial nature of a pressure vessel or other types of vessels of heavy construction, the lid 14 can be quite heavy in the order of one hundred to three hundred pounds or even more. This weight is usually too much for an operator to lift and open the vessel for servicing. To facilitate opening of the lid a lid lifting mechanism 24 is provided assisting in pivoting the lid 14 to an open position. In accordance with this particular embodiment of the invention the lid lift mechanism comprises a pivot arm 26 on a pivot mount 28. The pivot arm has a distal end 30. A pretensioned retracting device 32 is provided and connected to the distal end of the lever arm 30 with a connector 34. The lower end of the retracting device is pivotally connected at 36 to the vessel container wall 38. In this particular embodiment the lever arm 26 comprises two members 40 and 42 which are welded to the lid 14 the arm 40 and 42 are pivotally connected at 44 to the pivot mount 28 which in turn is secured at 46 to the container wall. The pivot mount 44 may be a pin connected to the arms 48 of the pivot mount 28 and extend through a bushing 50 which in turn may be secured between the arms 40 and 42. The pivoting at 36 of the retracting device 32 allows the retracting device to follow the movement of the lid from its closed to its open position. Usual pivot pins 52 may be provided on lugs 54 which are secured to the container wall 38.

Figure 2:
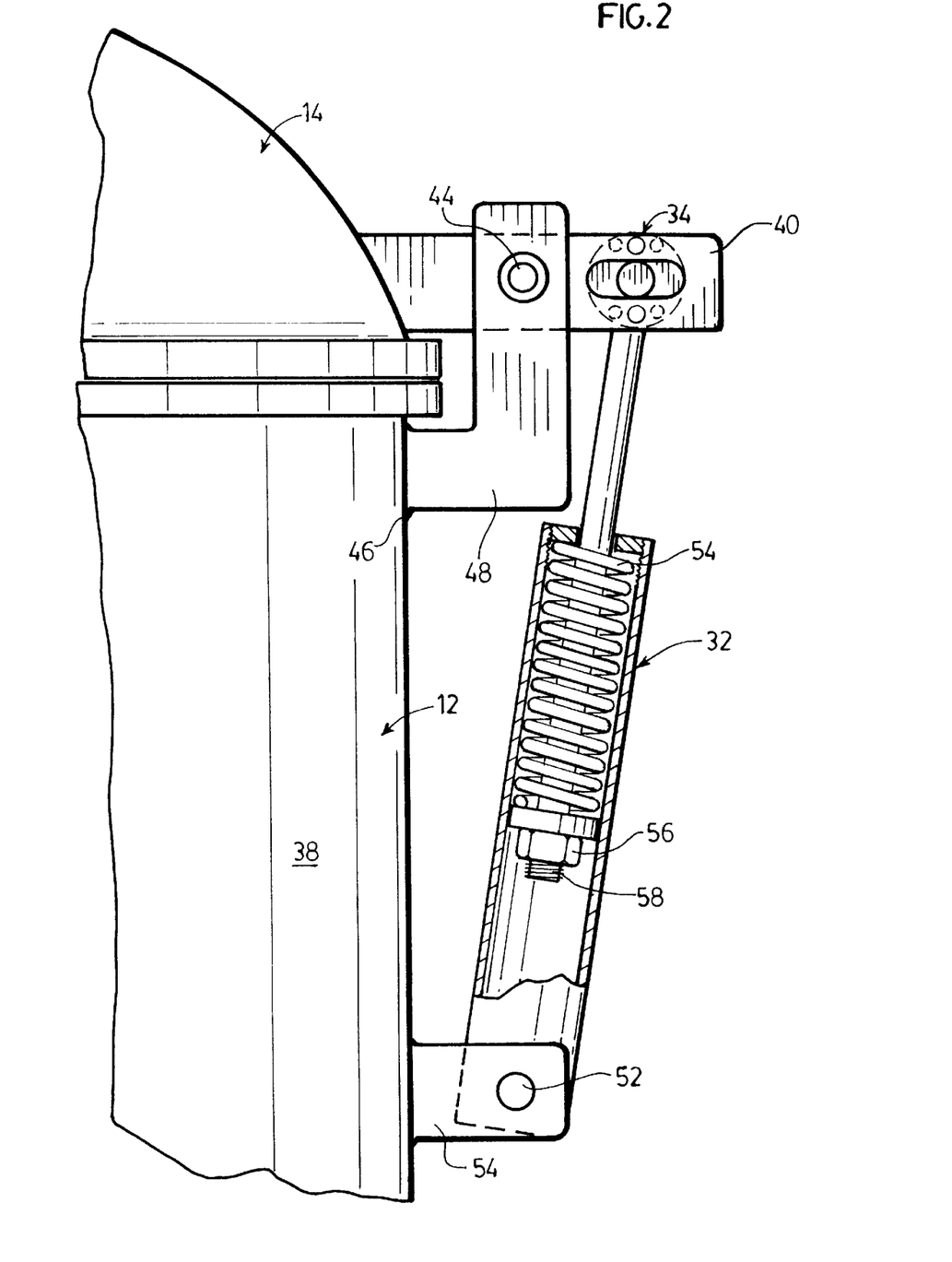
FIG. 2 is a section through the lid lifting mechanism of FIG. 1 with the lid in the closed position.

As shown in FIG. 2 the section through the pretensioned retracting device 32 shows that a coiled spring 54 is pretensioned by nut 56 being advanced along threaded rod 58. The pretensioned retracting device 32 is set at a tension which is slightly under balanced for the weight of the lid in the closed position. When the clamping device 16 is removed this slight under balance prevents the retracting device from popping the lid open. The extent of under balance is minimal so that an operator can readily push the lid to the open position.

Figure 3:
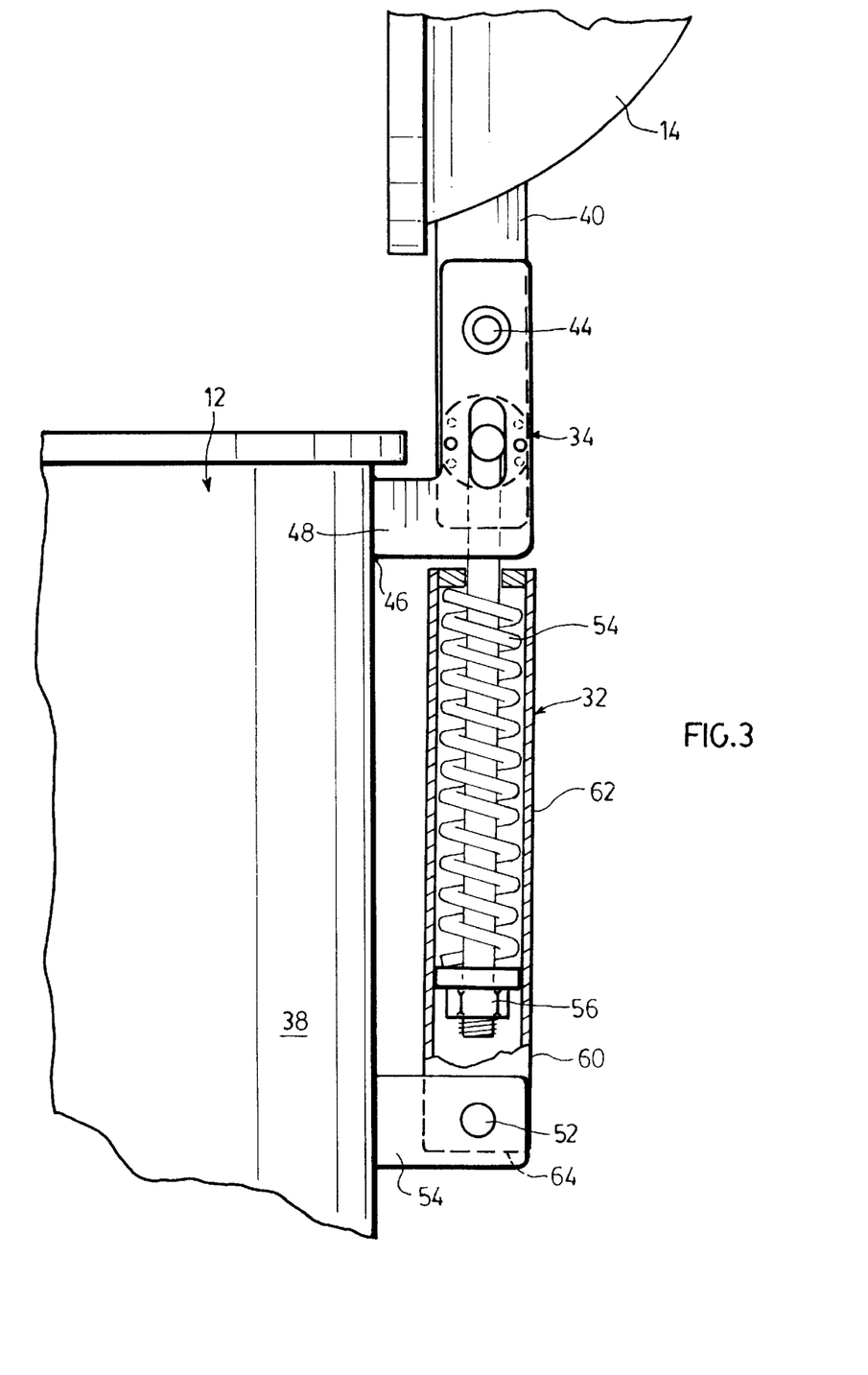
FIG. 3 is a section through the lid lifting mechanism of FIG. 1 with the lid in the open position.

Turning the FIG. 3, the lid 14 is shown is its open position as pivoted about bushing 44. The pretension retracting device 32 is moved from the position of FIG. 2 to the position of FIG. 3 and thereby follows the movement of the lid due to the pivot connection at 52. The pretensioned spring 54 has expanded and released its stored energy in assisting in moving the lid to the open position. With the spring 54 in its extended position, the adjustment nut 56 is exposed at the base portion 60 of the cylinder 62. The cylinder 62 may be released from the pivot point 52 to allow access through the open underside 64 of the cylinder 62 to permit further adjustment of the nut 56 to achieve the desired degree of under balance in counter balancing the weight of the lid to the open position.

This technique for adjusting the pretensioning of the retracting device is relatively convenient. There is always a need for a fine adjustment in the tensioning of the retracting device to compensate for build up or removal of material on the inside of the lid thereby adding or removing weight on the lid and possibly a slight weakening of the spring to avoid having to remove the pivot point 52 to adjust the tension in the spring. In accordance with an aspect of this invention a very convenient readily accessible system is provided for fine tuning the pretensioning device.

Figure 4:
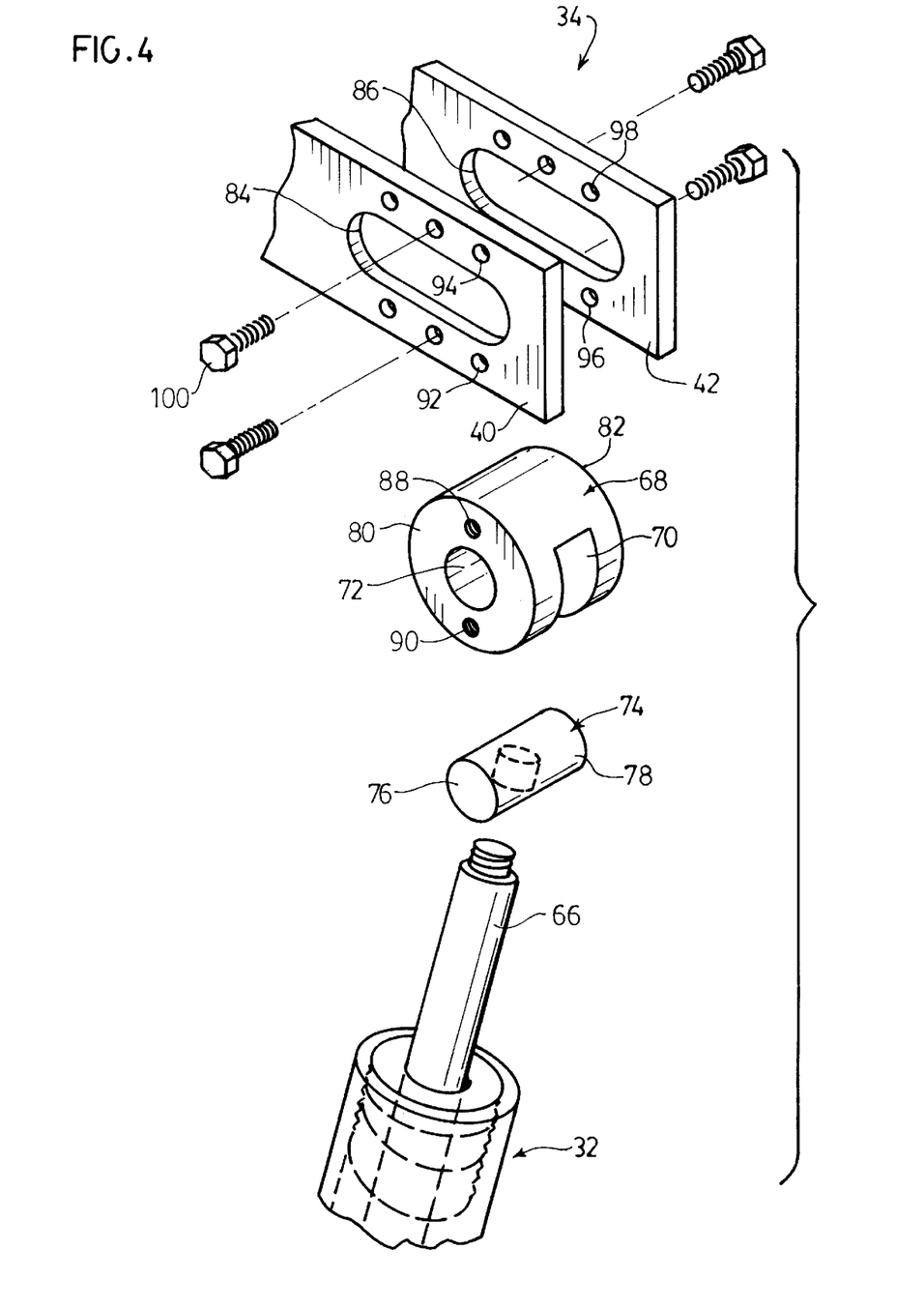
FIG. 4 is an exploded view of the connection of the lifting mechanism to the lever arm secured to the lid.

With reference to FIG. 4, further details of the connector 34 for connecting the rod 66 of the retracting device 32 is shown in exploded view. The connector device in accordance with this particularly embodiment includes a bushing 68 with a slot 70 cut therethrough and intercepting the bore 72 in the bushing. The T-shaped end 74 of the rod 66 is fitted into the bushing where the T-shaped ends 76 and 78 extend through the bore 72 and may extend outwardly beyond the sides 80 and 82 of the bushing where the rod 60 is allowed to move through the slot 70. The bushing 68 is positioned between the arms 40 and 42. The arms 40 and 42 have opposing longitudinally extending open slots 84 and 86. The bushing has on each side 80 and 82, threaded bores 88 and 90. These threaded bores are spaced apart to be aligned with the individual sets of holes 92 and 94 in arm 40 and 96 and 98 in arm 42. There are three sets of holes to define three set positions or three multiple stop positions for locating the bushing 68 between the arms 40 and 42. With the bushing assembled on the T end 74 and the bushing located between the arms 40 and 42, bolts 100 are positioned through the desired hole 92, 94, 96 and 98 and threaded into the respective threaded bores 88 and 90 of the bushing to set the bushing in the desired positions on the arms 40 and 42. This bushing system as a means for mounting the connector on the arm distal end therefore provides for movement along the arm by way of the elongate slots 84 and 86 to increase or decrease the moment arm length of the retracting device relative to the pivot mount 44.

Figure 5:
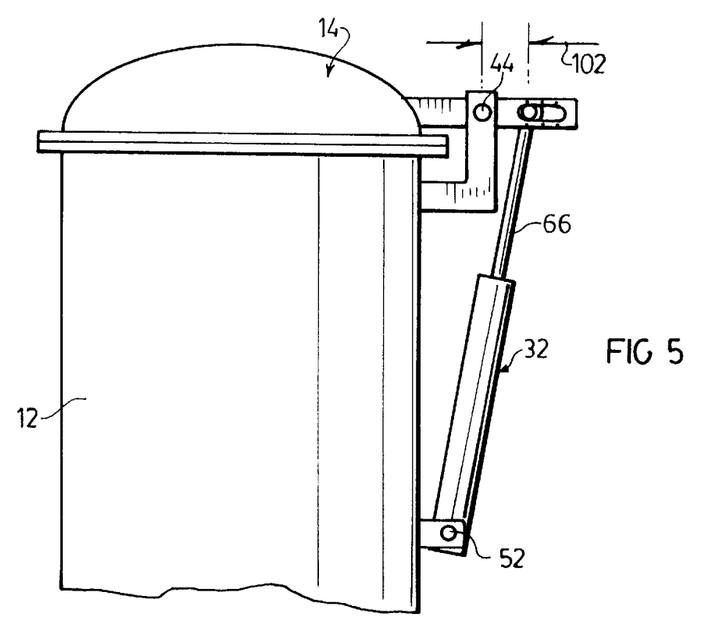
FIG. 5 shows a first position for the means for adjusting the location of the pivotal connection of the retracting device to the lid opening mechanism.
Figure 6:
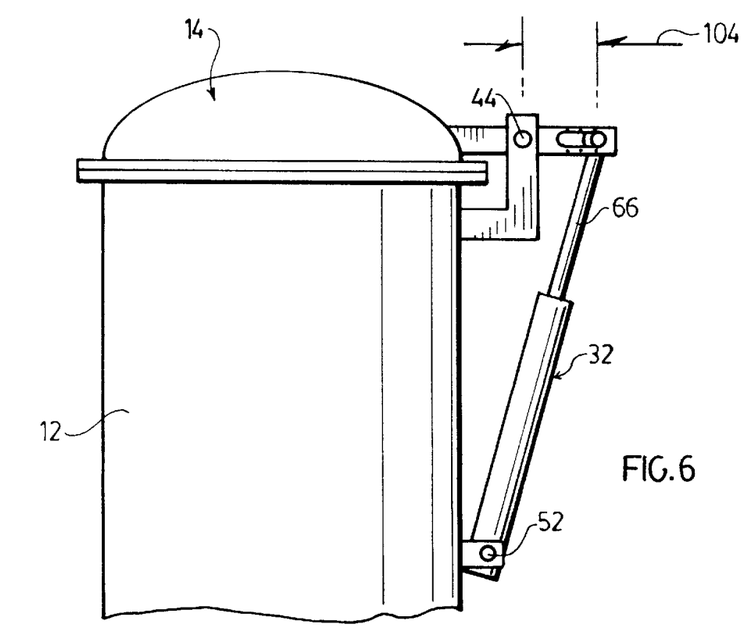
FIG. 6 shows a second position for the pivotal connection of the retraction device to the lid lifting mechanism.

As shown in FIG. 5 and FIG. 6 the adjustment of the pretensioning device may be finely tuned. In normal operation, the bushing may be secured to the center set of holes 92, 94, 96 and 98 of the arms 40 and 42 that is, the position shown in FIG. 4. When it is desired to decrease the assist of the retracting device 32 in opening the lid, the bolts 100 may be removed and the bushing advanced to the inner set of holes as shown in FIG. 5 and secured in place thereby providing a decreased moment arm indicated by arrows 102. This position may be assumed when the lid is lighter and it is necessary to decrease the counter balance. At the other extreme when the lid is heavier due to perhaps build up of materials on the inside of the lid, the bushing 68 may be positioned at the outer set of holes on the arms 40 and 42 to the position shown in FIG. 6 thereby increasing the moment arm as indicated by arrows 104. This in turn increases the counter balance to compensate for a heavier lid 14 as in understood the extent of the moment arm is defined relative to the lid pivot mount 44.

Figure 7:
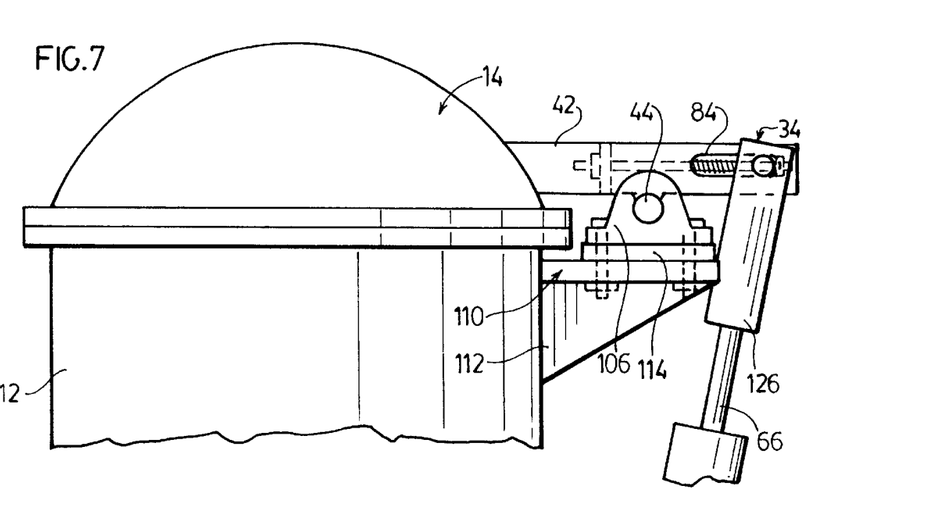
FIG. 7 is a side elevation of an alternative embodiment for the adjusting device for the pivotal connection of the lid lifting mechanism.
Figure 8:
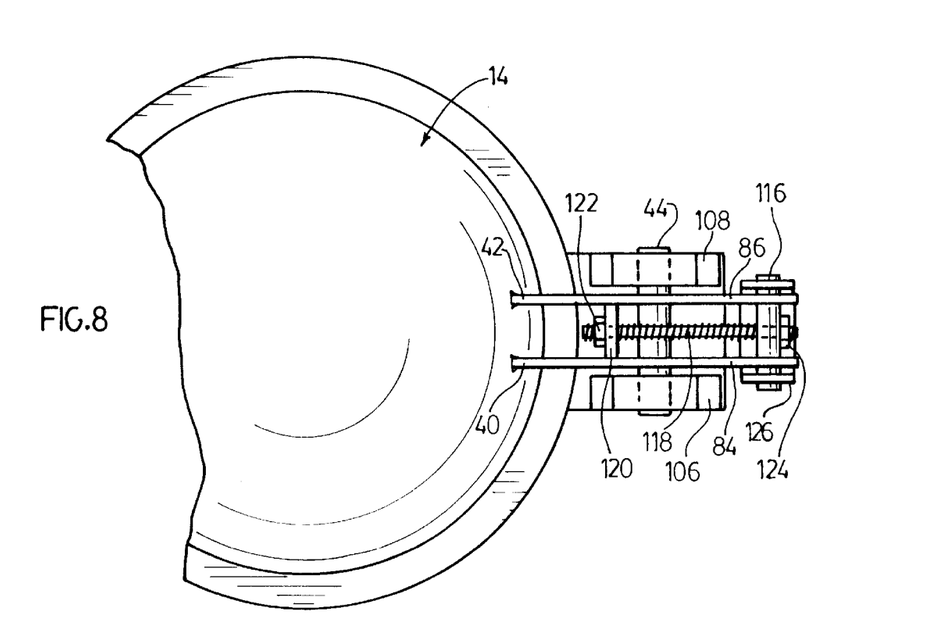
FIG. 8 is a top plan view of the adjustment device for the pivotal connection of the retracting device to the lid lifting mechanism.

An alternative embodiment for adjusting the moment arm is shown in FIGS. 7 and 8. This embodiment provides for an infinite adjustment of the position of the end of the rod 66 relative to the pivot point 44. The pivot mount for this embodiment is somewhat different from that of FIG. 1. The pivot rod 44 is mounted in spaced apart bearings 106 and 108. The bearings 106 and 108 are mounted on ledges 110 which are secured to the container 12 by reinforcing webs 112. A spacer 114 is provided between the bearing 106 and the ledge 110. The thickness of the spacer may be varied to provide for adjustment in aligning the lid 14 with the container 12. Such alignment may be necessitated due to manufacturing tolerances. Suitable shims may be used to vary the thickness of the spacer 114 in ensuring that the lid is sitting flat on the container. The connector 34 in accordance with this embodiment comprises a pin 116 which extends through the respective slots 84 and 86 of the arms 40 and 42. The pin has a threaded rod 118 extending therethrough. The threaded rod is threaded into a plate 120 secured between the arms 40 and 42 and a lock nut 122 locks the threaded arm in position. Adjustment for the position of the pin 116 along the slots 84 and 86 is provided by adjustment nut 124. By advancing or retracting the nut along the threaded rod 118 varies the position of the pin 116 in the elongate slots 84 and 86. This in turn moves the yoke 126 which is connected to rods 66 and is secured to the retracting device. A suitable lock nut can also be provided to lock up the position of nut 124 once the desired pin position in achieved. Hence by virtue of this threaded rod system, infinite adjustment of the location of the connector may be achieved to adjust the extent of retracting device assist in pivoting the lid to the open position.

Accordingly, a simple readily manufactured lid lift assist system is provided. Multi stop or infinite positioning of the connector for the retractor rod is provided to readily adjust for lid weight variations. The system is readily maintained where the set up is readily assessable for adjustment.

Although preferred embodiments of the invention have been described herein in detail, it will be understood by those skilled in the art that variations may be made thereto without departing from the spirit of the invention.

What is claimed is:

1. A lid lifting mechanism for assisting in pivoting to an open position, a lid for a vessel, said mechanism comprising:

i) a pivot arm adapted to be secured to a vessel lid, said pivot arm having a pivot mount intermediate its length, said pivot arm extending beyond said pivot mount to provide a distal end;

ii) a pretensioned retracting device for assisting in pivoting said arm from a lid closed to a lid open position, and means for adjusting retracting device tension;

iii) a connector for connecting said retracting device to said distal end, means for mounting said connector on said arm distal end for movement along said arm to increase or decrease moment arm length of said retracting device relative to said pivot mount and thereby adjust extent of retracting device assist in pivoting said lid to a lid open position.

2. The lid lifting mechanism of claim 1 wherein said connector mounting means comprises a slide and set means for setting said moment arm length.

3. The lid lifting mechanism of claim 2 wherein said set means comprises a multiple position stop.

4. The lid lifting mechanism of claim 2 wherein said set means comprises a rotatable screw to adjust said moment arm length.

5. The lid lifting mechanism of claim 1 wherein said pivot mount for said arm is secured beneath said arm.

6. The lid lifting mechanism of claim 1 wherein said retracting device is pretensioned by a compressed spring, said tension adjusting means being capable of adjusting compression in said spring.

7. The lid lifting mechanism of claim 1 wherein pivot arm is connected to perimeter of a vessel lid, a support is secured to said vessel wall to support said pivot mount, an end of said retracting device opposite said connector is pivotally connected to said vessel wall to secure said retracting device and permit it to swing about said pivot point when opening and closing said lid, said moment arm being adjustable to compensate for build up or removal of material on lid interior.

* * * * *

UNITED STATES PATENT AND TRADEMARK OFFICE
CERTIFICATE OF CORRECTION

PATENT NO.    : 6,378,249 B1
DATED         : April 30, 2002
INVENTOR(S)   : Foss et al.

It is certified that error appears in the above-identified patent and that said Letters Patent is hereby corrected as shown below:

<u>Title page,</u>
Item [56], References Cited, U.S. PATENT DOCUMENTS, insert the following:

-- 2,777,157    1/1957    Burke
   4,601,131    7/1986    Ozols
   5,857,403    1/1999    Mann --.

FOREIGN PATENT DOCUMENTS, insert the following"

-- GB   939,743   10/1963 --.

Signed and Sealed this

Twenty-ninth Day of April, 2003

JAMES E. ROGAN
*Director of the United States Patent and Trademark Office*